INVENTOR.
PIERRE IVAN PEYCHES
BY *Bauer and Seymour*
ATTORNEYS

INVENTOR.
PIERRE IVAN PEYCHES
BY
Bauer and Seymour
ATTORNEYS

INVENTOR.
PIERRE IVAN PEYCHES
BY Bauer and Seymour
ATTORNEYS

United States Patent Office 3,256,124

Patented June 14, 1966

3,256,124

METHOD AND APPARATUS FOR POLYCHROME STRIPED SCREENS FOR COLOR TELEVISION RECEIVER

Pierre Ivan Peyches, Paris, France, assignor to Compagnie de Saint-Gobain, Neuilly-sur-Seine, France Filed Dec. 23, 1960, Ser. No. 78,077

Claims priority, application France, Apr. 22, 1960, 824,986

18 Claims. (Cl. 156—167)

This invention relates to polychrome striped screens for use in color television.

It is known that it is possible to reconstitute the color scale by combination of at least three appropriate primary colors. This principle is the basis of the largest part of color television systems, which utilize the principle of splitting up an image into three monochromatic images each of which is in one of the three primary, coordinate colors; the three images are transmitted electronically to the receiving screen. Generally these screens are of the polychrome type and are viewed with direct vision. Some of the screens are made by the dot stippling of pin-point elementary surfaces onto a transparent support and others are made by the application to the support of parallel stripes. Dots and stripes are generally made of fluorescent substances which emit, under the impact of an electronic beam, a light which is colored according to that one color of the primary colors in the screen which is found in the particular dot or stripe. The parallel stripes are preferable to the stippled surfaces, both for their luminous efficiency and for easier manufacture.

It is also possible to use screens constituted by a film of pigments with white homogeneous luminescense, in front of which is placed a conveniently colored optical filter.

The manufacture of the polychrome screens with striped structure is very difficult, due to the fact that the great number of stripes required for a good integration of the image and differentiation of the colors, for the observer, required great fineness and exact parallelism of the stripes.

My invention has for an object striped polychrome screens for color television which have excellent characteristics of fineness and regularity of line. According to the broad aspects of my invention, the lines of the colored screen are made by mounting transparent, colored glass filaments on a transparent support and coating them with a uniform film containing pigments with white luminescence. Glass is particularly well adapted to the production of uniform filaments having a diameter on the order of some tenths of millimeter, and the colors available in glass are very well adapted to the polychromy of the television system.

The electrically conductive metal grid generally associated with prior screens may be installed in the new screens with known electrical connections and thus may be advantageously incorporated in the colored filter constituted by the glass filaments. Novel conducting filaments may be made of opaque glass rendered conductive by metallization, reduction, etc.

Due to their flexibility, the filaments constiuting the screen are easily adaptable to the shapes of the support panels of television tubes.

It is advantageous, in manufacturing the screen to produce a flexible sheet of filaments joined side by side, which are thereafter applied on the support, which may be the bottom of the tube, and are fixed there by a transparent enamel or by self-soldering. In this case it is advisable to select the glass compositions in order that the expansion coefficient of the different filaments be practically the same as that of the glass support. The glass filaments may be applied to a temporary support and joined by means of a combustible binding material, or they may be joined by a depolymerizable resin such as methyl-polymethacrylate, or any other material able to be entirely eliminated at higher temperature, before being applied to the permanent support which is part of the screen. After the application of the sheet of filaments to the bottom of the tube, and the elimination of binder and temporary support the process of manufacture is the same as for a television screen in white and black, that is, sedimentation of a substance with white luminescence and, if desired, metallization.

It is surprising that, in spite of the corrugation of the sheet on which is placed the luminescent substance, the light transmission through each glass filament seems homogeneous to the observer.

If the conductive grid be separated from the colored filter, it is possible to utilize a separate metallic grid, the wires of which are masked by non-transparent filaments of the same dimensions, which take the place of the electrical conducting filaments in the screen described above.

It is an object of the invention to provide a novel and useful polychrome screen of the type which utilizes a homogeneous layer of white luminescent pigments in association with an optical filter of parallel colored band type. Another object of the invention is to provide novel and useful methods for making the new screens. The objects of the invention as to product are accomplished generally speaking by a television screen having a transparent glass support, a layer of transparent enamel coating a face thereof, a multiplicity of contiguous filaments of transparent colored glass arranged in parallel in repeating sets containing at least three primary colors attached to the enamel, and a layer of material responsive to electronic rays covering the filaments, and the objects as to process are accomplished by a method of making a television screen that comprises mounting sets of red, green and blue glass filaments on the surface of a glass support in substantially contiguous and parallel relationship, and coating the filaments with a coating responsive to bombardment by electronic rays. Other objects and accomplishments of the invention include novel elements which are useful in the invention and which will be described and claimed hereinafter.

The screens of this invention may be used in color television processes but this use is not a limitation as the screens are generally useful in excitation by electronic rays, particularly cathode rays.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings wherein like reference characters refer to like parts throughout the several views, FIG. 1 is an apparatus adapted to the manufacture of the novel screens;

EXAMPLE I

Figure 1:
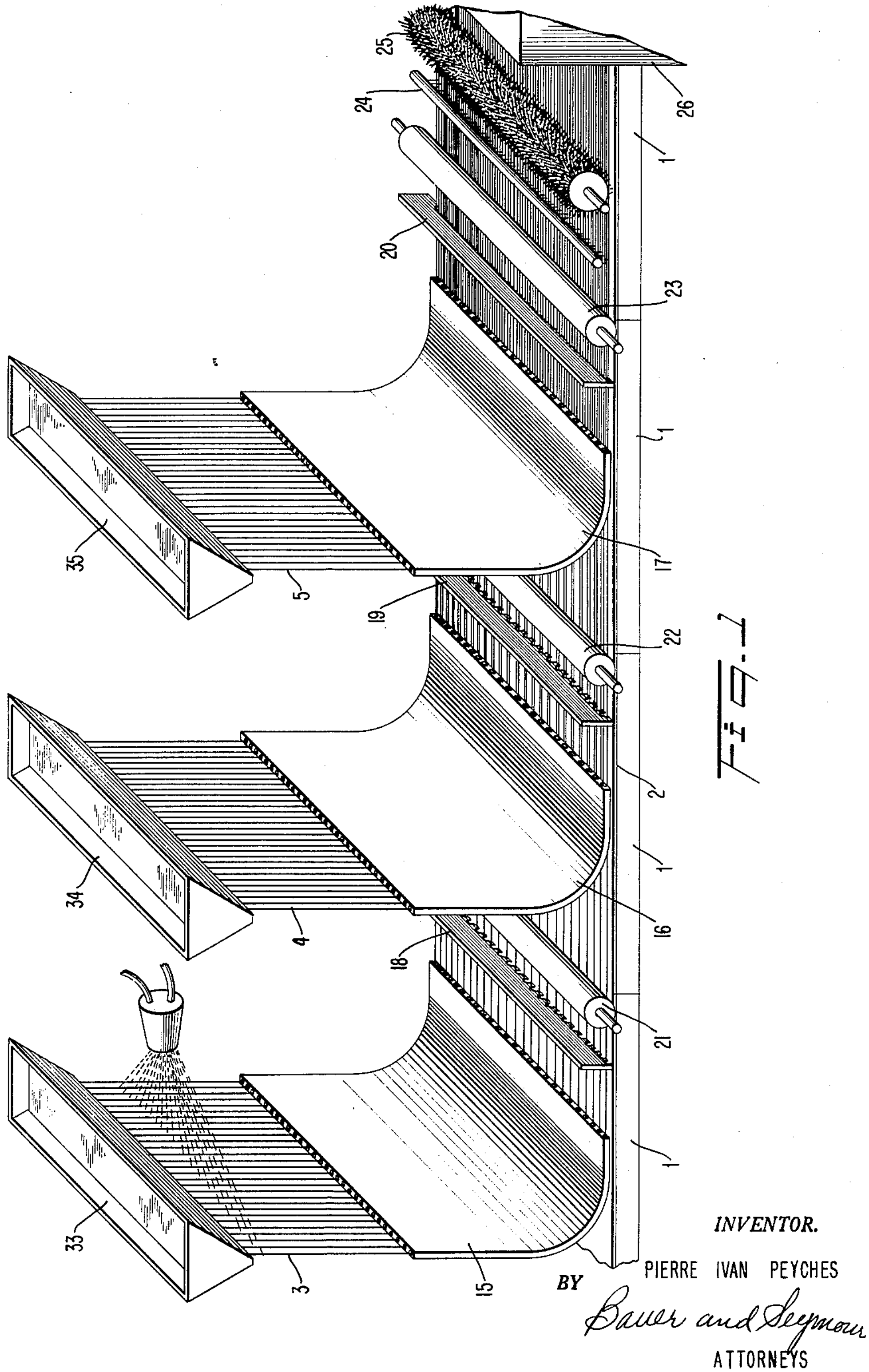

Referring particularly to FIG. 1, there is shown a series of glass supports which are carried by a conveyor (not shown) along a predetermined path to an oven 26. The glass supports 1 are transparent and of a size and thickness adapted for use in television tubes. The supports 1 are contiguous and pass in sequence below glass filament forming apparatus 33, 34, 35, which are diagrammatically indicated being of known construction. The device 33 forms a multiplicity of filaments of green glass having a diameter suited to the manufacture of an optical grid, for instance about from $\frac{2}{10}$ to $\frac{4}{10}$ mm. Adjacent fibers are separated by twice the diameter of a single filament. A guide 15 receives the filaments 3 and lays them on the surface of the supports 1, which are coated with a transparent enamel 2 of relatively low melting point compared to the glass 1. The melting point of the enamel 2 is such that it will melt in the heat of the oven 26 and attach the filaments to the supports 1. Comb 18 and roller 21 serve to maintain the exact parallelism and separation of the filaments and, by driving roller 21 the progress of the filaments at the same speed as the supports is achieved. The apparatus 34 forms blue glass filaments 4 which are laid parallel and contiguous to green glass filaments 3 by guide 16, comb 19 and roller 22. Apparatus 35 forms red glass filaments 5 which are deposited continuously and parallel to filaments 4 and which will be contiguous to the next green glass filament in the series or not depending upon whether the screen is to be of the type shown in FIG. 2 or of the type shown in FIG. 3. The apparatus of FIG. 1 illustrates the formation of a screen of the type of FIG. 2 which is provided with the interstitial enamel of FIG. 4, consequently, in FIG. 1 the screen produced will have contiguous and parallel filaments in series of three, each series containing a green, blue and red glass filament.

After passing by the comb 20 which maintains the alignment of all the fibers which have been deposited on the enamel, the fibers pass under the roller 23, which sets them properly in the enamel, and goes to a device 24 which feeds loose dry enamel of opaque characteristic onto the surfaces of the filaments. A brush 25 removes the enamel from the tops of the filaments leaving it in the interstices between the tops of the filaments as shown at 28 in FIG. 4.

The supports 1 then pass into the oven which is maintained at a temperature between the melting points of the two types of enamel and the melting point of the glass support 1. The enamel melts below and above the fibers forming a uniform and transparent coat which attaches the filaments to the supports 1 and provides the upper portions with interstitial opaque areas which improve the optical qualities of the screen.

Figure 3:
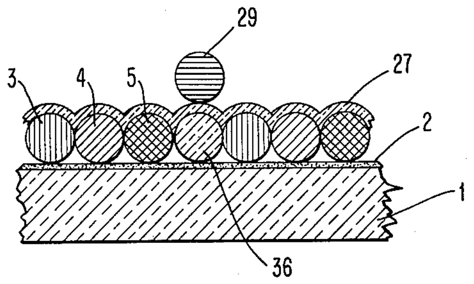
FIG. 3 is an enlarged section through a modified form of screen.

When it is desired to make a screen of the type shown in FIG. 3, a fourth fiber forming apparatus, similar to 33, is provided which deposits an opaque glass fiber 36 between each set.

After the screen is discharged from the oven it is cooled and a white luminescent layer 27 is applied over the tops of the sets of colored glass filaments.

In this invention the layer of luminescent pigments for the screen can be made as they are made for black and white tubes. These pigments are usually mixtures of zinc sulfide, and cadmium sulfide of high purity including activators which differ according to the manufacturer. These products are known and need not be described herein, particularly as they are usually described in the sales literature of the companies which make them.

The standard glasses which are used in the formation of glass filaments are useful in this invention and their compositions need not be described as they can be derived from the published art dealing with the manufacture of glass fibers and filaments. It suffices to add the appropriate coloring material, usually metal salts, to the glass composition, for example for blue glass one adds a small proportion of cobalt salt to the glass batch. For green glass one may incorporate chromium and copper oxides. For red glass selenium, gold and copper provide the color. In the manufacture of such screens it is not necessary to rely upon the coordinate colors green, blue and red, it being possible to achieve a reconstitution of the visible spectrum by the use of at least three coordinate primary colors of which green, blue and red are exemplary.

In order to avoid the difficulty that could be experienced because of a difference in coefficient of expansion between the support and the fibers attached to it, the basic glass used for the preparation of the differently colored fibers can be the same as the variation in the coefficient of expansion which can result from the addition of the coloring material would be sufficiently small. Moreover this glass can have a coefficient of expansion sufficiently close to that which is used in the manufacture of television tubes to make the difference unimportant.

Alternately the sheet of filaments may be produced continuously and directly on a support constituted by a sheet of glass which is flat or slightly transversely curved with respect to the direction of travel of the sheet. The glass sheet provided with the sheet of filaments is then cut to dimensions suitable for screens, and the panels may be thereafter shaped to the desired form.

EXAMPLE II

Another method of manufacturing these novel screens is to apply to adhesive paper the sets of colored fibers in the order in which they are to appear on the glass support, covering the fibers with a layer of depolymerizable resins such as polymethyl methacrylate. The paper band is then removed, leaving the fibers attached to each other only by the resin. This provides a grid of fibers on a depolymerizable organic support which can be eliminated by simple heating without leaving any traces. When this grid is applied to the support and the support is admitted to the oven the adhesive is volatilized before the enamel is softened so that the attachment of the grid to the support occurs cleanly. In Example I there is direct application of the optical grid to the glass support. In Example II a transfer process is used in which the grid is applied to a support which can be eliminated without a trace.

Figure 2:
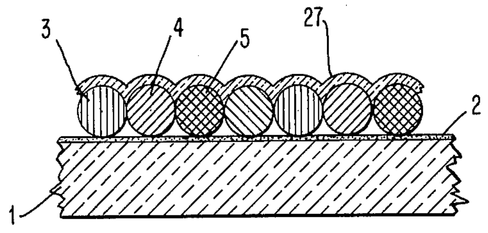
FIG. 2 is an enlarged section through one form of screen.
Figure 4:
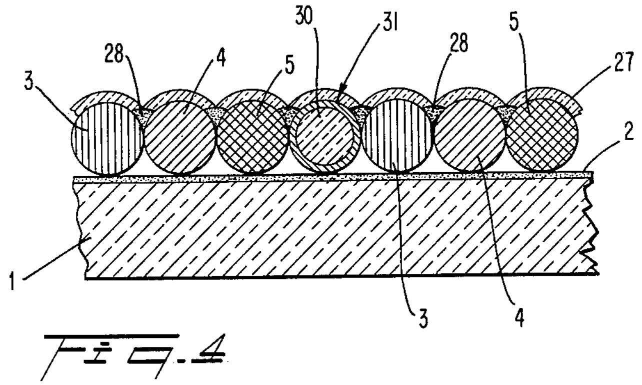
FIG. 4 is an enlarged section through a further modification.

Among the novel grids which can be produced by this invention are those which are shown in FIGS. 2, 3 and 4. In FIG. 2 is a support which has attached to it by enamel 2, sets 3, 4, 5 of green, blue and red filaments in repeating order, which are covered by a white luminescent coat 27. This is a simple and very useful type of screen.

In FIG. 3 each set of three colored fibers is followed by a fiber of opaque glass 36 above which, outside the white luminescent coat 27, is a metal wire 29 forming a part of the metal grid which is characteristic of color television systems in which there is an electrically conductive filament, which need not be metal so long as it is conductive, above each colored set. Under the impact of the cathode rays a beam periodically engages the grid thus permitting a synchronization of the beam in order that the three different colors blue, green and red be obtained in the desired order and at the desired location.

The transparent enamels of low melting point which are used to attach the filaments to the support can be made with a base of lead oxide.

The metal wires 29 should be mounted behind the opaque filaments 36 so that they will be invisible to the observer. The opaque glass filaments can be made by incorporating manganese oxide, nickel oxide, iron oxide or cobalt oxide in the same glass as used for the other filaments.

In FIG. 4 there is shown a modification of some importance. In this figure the usual sets 3, 4, 5 of colored glass are separated by filaments 30 which bear a conductive coat 31. One may obtain conductive transparent coats on glass by supplying solutions of tin salt or of antimony or indium salt. For example, one may spray on the desired fibers an alcoholic solution of stannic chloride and antimony chloride as the filaments issue, in FIG. 1, from a forming apparatus like 35, and which would follow immediately after the roller 23. Thus, in FIG. 4, the sets of three primary colors would be separated by means of opaque fibers with electrically conductive coats. These solutions would be sprayed on the fibers at a temperature between 350 and 550° C. or at lower temperature. The solution should contain an appropriate reducing agent such as formaldehyde or urea.

In a further modification of the invention the transparent enamel is eliminated from the surface of the support 1 and the temperature of the oven is carried to a point sufficient to soften the surface of the fibers or the surface of the support or both sufficiently to provide mutual, homogeneous attachment, that is to say, they are self-sealed or self-soldered by heat.

Figure 5:
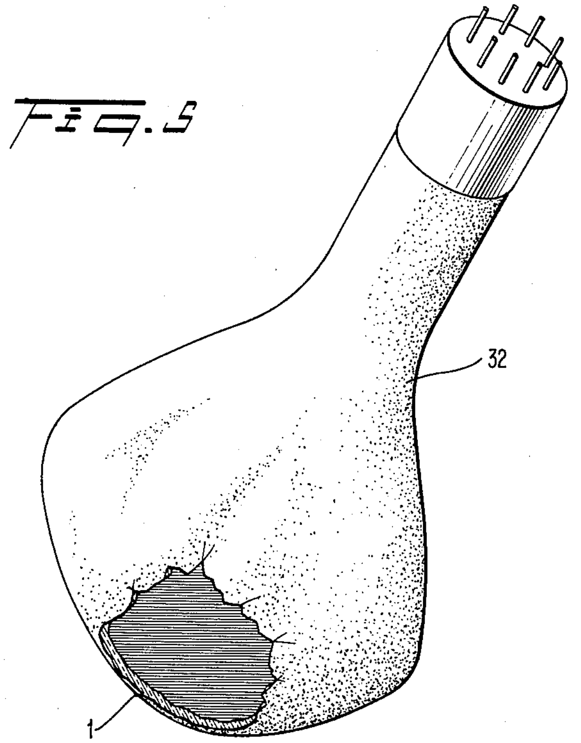
FIG. 5 is a diagram of a television tube embodying a novel screen, a portion of the tube being broken away.
Figure 6:
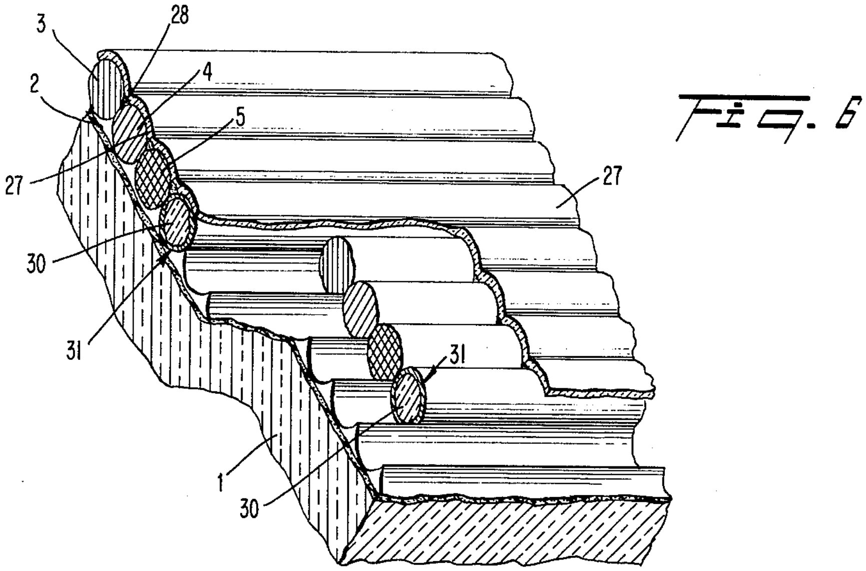
FIG. 6 is an enlarged section taken out of the screen of FIG. 5.

In FIG. 5 is illustrated a television tube 32 in which a support 1 with its attached filaments forms the target. In FIG. 6 a section has been cut out of the screen and enlarged to show the relation of the parts, the numbers of which correspond to those which have been used hereinabove.

Among the advantages of the invention are the production of screens and targets of high utility and superior strength by new and convenient methods of manufacture. A particular advantage of the invention is the elimination of the old laborious and inaccurate methods of applying strips to the face of the target. Another advantage is the provision of strips in the form of glass filaments whose diameters can be uniformly and accurately controlled to correspond precisely to the width of the exciting rays. A further advantage is the adaptation of the new screens to particular television systems. Other advantages are in the preparation of particular novel elements of structure and in the combination of such elements with the other elements of the screens.

According to another embodiment of the invention, the sheet of filaments may be constituted by a warp comprising the colored filaments regularly distributed in sets of three colors and by a loose weft entirely eliminable, the weft being combustible or soluble (filaments of sodium silicate).

As many apparently widely different embodiments of the present invention may be made without departing from the spirit and scope thereof, it is to be understood that the invention is not limited to the specific embodiments.

What is claimed is:

1. A method of making a television screen that comprises mounting sets of red, green and blue continuous glass filaments on the surface of a glass support in substantially contiguous and parallel relationship to form a layer, and coating the layer of filaments with a white luminescent layer responsive to electronic rays.

2. A method of making a television screen that comprises mounting sets of continuous transparent filaments of colored glass, containing in each set a filament in each of at least three correlated primary colors, in substantially contiguous and parallel relationship to form a layer on the surface of a transparent support, and covering the layer of filaments with a white luminescent coating responsive to bombardment by electronic rays.

3. Apparatus for making television screens comprising means to transport a screen support along a predetermined path, means to form a multiplicity of glass filaments of one primary color and to attach them in parallel on the surface of the support, means to form a multiplicity of glass filaments of another, correlated primary color and to attach them to the support in contiguous relation to the filaments of the first color, means to form a multiplicity of glass filaments of a third, correlated primary color and to attach them to the support in contiguous relation to the filament of the second color, and means to cover the filaments with a layer of white luminescent material responsive to electronic rays.

4. Apparatus according to claim 3 in which means is provided to fill the interstices between the tops of the filaments with opaque enamel, and heating means is provided to set the enamel.

5. Apparatus according to claim 3 in which the support is composed of glass, covered on its upper face with a thin layer of lower melting, transparent enamel, the filaments are laid on the said enamel, heating means capable of softening the enamel is provided after the fiber forming and laying means, whereby to attach the filaments to the face of the support.

6. Apparatus according to claim 4 including means to coat the enamelled filaments on the support with a layer of luminescent material responsive to electronic rays.

7. Apparatus according to claim 3 including means to deposit an opaque filament between sets of transparent filaments.

8. Apparatus according to claim 7 including means to apply electrically conductive filaments above the layer of white luminescent material.

9. Apparatus according to claim 3 including means to deposit between sets of transparent filaments an electrically conductive filament consisting of an opaque glass core surrounded by an electrically conductive coat.

10. Apparatus according to claim 3 including means to deposit between sets of transparent filaments an electrically conductive filament consisting of a glass core bearing an electrically conductive coat.

11. A method of making polychrome, cathode ray screens including a transparent glass support which comprises depositing a layer of lower melting, transparent enamel upon the support, laying optically complementary colored glass filaments in sets, in contiguous parallel relationship, upon the enamel in sufficient number to form a screen, heating the enamel to a temperature above its melting point and below that of the support, and cooling the screen.

12. A method of making polychrome, cathode ray screens which comprises moving a series of transparent glass supports coated with a transparent, lower melting enamel along a course, depositing blue, red, and green glass filaments in contiguous relation on the enamel, depositing low melting opaque enamel in the interstices between the filaments, heating the supports to a temperature between their melting point and those of the enamels, and cooling the screens.

13. A method of making polychrome, cathode ray screens which comprises laying a glass support coated with a transparent, lower melting enamel along a course, seating optically complementary glass filaments in contiguous, parallel relation on the enamel, depositing strips of opaque, lower melting enamel in the interstices between the filaments, heating the support to a temperature between their melting point and those of the enamels, cooling the screen, and applying a white luminescent layer over the filaments.

14. A method according to claim 11 in which each set has at least three filaments in complementary colors.

15. A method according to claim 11 in which each set has a terminal filament of opaque glass.

16. A method according to claim 11 which includes the additional step of applying a layer of white luminescence upon the filaments.

17. A method according to claim 15 which includes the step of applying control wires above the opaque filaments.

18. A method according to claim 15 which includes the additional steps of applying a layer of white luminescence upon the filaments and applying control wires above the layer in alignment with the opaque filaments.

References Cited by the Examiner

UNITED STATES PATENTS

| | | | |
|---|---|---|---|
| 2,610,387 | 9/1952 | Borland et al. | 29—25.17 |
| 2,706,262 | 4/1955 | Barnes | 313—92 |
| 2,734,013 | 2/1956 | Myers | 156—67 |
| 2,750,525 | 6/1956 | Palmer | 313—92 |
| 2,757,112 | 7/1956 | Hoyt | 156—67 |
| 2,796,374 | 6/1957 | Donahue | 156—67 |
| 2,858,233 | 10/1958 | Yanagisawa | 313—92.5 |
| 2,955,348 | 10/1960 | Healy | 29—25.17 |
| 3,023,137 | 2/1962 | Colborne et al. | 156—67 |

EARL M. BERGERT, *Primary Examiner.*

DOUGLASS DRUMMOND, ANDRES NEILSAN, C. O. GARDNER, *Assistant Examiners.*